United States Patent
Rajadurai et al.

(10) Patent No.: US 9,661,525 B2
(45) Date of Patent: May 23, 2017

(54) GRANULAR NETWORK ACCESS CONTROL AND METHODS THEREOF

(71) Applicant: Samsung Electronics Co., Ltd., Suwon-si, Gyeonggi-do (KR)

(72) Inventors: Rajavelsamy Rajadurai, Bangalore (IN); Satish Nanjunda Swamy Jamadagni, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 184 days.

(21) Appl. No.: 14/382,997

(22) PCT Filed: Mar. 20, 2013

(86) PCT No.: PCT/KR2013/002293
§ 371 (c)(1),
(2) Date: Sep. 4, 2014

(87) PCT Pub. No.: WO2013/141600
PCT Pub. Date: Sep. 26, 2013

(65) Prior Publication Data
US 2015/0036489 A1    Feb. 5, 2015

(30) Foreign Application Priority Data
Mar. 21, 2012 (IN) ............................ 1039/CHE/2012

(51) Int. Cl.
*H04W 28/02* (2009.01)
*H04W 48/02* (2009.01)
(Continued)

(52) U.S. Cl.
CPC ..... *H04W 28/0289* (2013.01); *H04L 47/2475* (2013.01); *H04W 12/08* (2013.01);
(Continued)

(58) Field of Classification Search
CPC ......... H04W 28/0289; H04W 28/0205; H04W 48/02; H04W 12/08; H04W 28/0215; H04W 4/00; H04L 47/2475
See application file for complete search history.

(56) References Cited

U.S. PATENT DOCUMENTS

2003/0007215 A1* 1/2003 Snawerdt ............. H04B 10/071
398/139
2006/0294095 A1* 12/2006 Berk ...................... G06Q 10/04
(Continued)

FOREIGN PATENT DOCUMENTS

WO    02/17671 A1    2/2002
WO    2012/013355 A1    2/2012

OTHER PUBLICATIONS

Hashim et al., Review of Multicast QoS Routing Protocols for Mobile Ad Hoc Networks, IJCSNS International Journal of Computer Science and Network Security, Dec. 2008, vol. 8 No. 12, Malaysia.

*Primary Examiner* — Ajay Cattungal
(74) *Attorney, Agent, or Firm* — Jefferson IP Law, LLP

(57) ABSTRACT

A method and system that enhances the existing access barring mechanism as specified in the current 3GPP specification is disclosed. The method disclosed provides enhancing the access barring mechanism to accommodate application level barring between the User equipment (UE) and the network. The method disclosed individually restricts or permits access of network to every requesting application on the UE, based on granular category of the application and priority levels of the application within the granular category. The method disclosed also specifies handling of back-off timers; reject cause values and Access Point Name (APN) configuration by Access Stratum (AS) and Non Access Stratum (NAS) layer to support application level barring of UEs using the enhanced access barring mecha- (Continued)

nism. The enhanced access barring mechanism enables providing service to applications independent of other barred applications or priorities. The method disclosed provides a mechanism for access control for connected mode UEs.

14 Claims, 3 Drawing Sheets

(51) Int. Cl.
    *H04W 12/08*     (2009.01)
    *H04L 12/859*    (2013.01)
    *H04W 4/00*     (2009.01)

(52) U.S. Cl.
    CPC ... *H04W 28/0205* (2013.01); *H04W 28/0215* (2013.01); *H04W 48/02* (2013.01); *H04W 4/00* (2013.01)

(56) References Cited

U.S. PATENT DOCUMENTS

| | | | |
|---|---|---|---|
| 2008/0056125 A1 | 3/2008 | Kneckt et al. | |
| 2008/0319282 A1* | 12/2008 | Tran | A61B 5/103 600/301 |
| 2009/0249020 A1* | 10/2009 | Vaidya | G06F 9/505 711/173 |
| 2012/0040643 A1* | 2/2012 | Diachina | H04W 4/005 455/411 |
| 2012/0117140 A1* | 5/2012 | Wang | H04W 4/005 709/201 |
| 2012/0265865 A1* | 10/2012 | Tanaka | H04L 41/044 709/223 |
| 2013/0122906 A1 | 5/2013 | Klatt | |
| 2013/0210406 A1* | 8/2013 | Vidal | H04W 4/00 455/418 |
| 2013/0281079 A1* | 10/2013 | Vidal | H04W 8/22 455/418 |

\* cited by examiner

Fig. 5

```
-- ASN1START

SystemInformationBlockType1x-r11 ::= SEQUENCE {
    ac-BarringExtInfo-r11           AC-BarringExtConfig-r11,
    lateNonCriticalExtension        OCTET STRING
    OPTIONAL,        -- Need OP
    ...
}

AC-BarringExtConfig-r11 ::=         CHOICE {
    ac-BarringExtCommon-r11              AC
ACBarringExtConfigSet- r11,
    ac-BarringExtPerPLMN-List-r11   SEQUENCE (SIZE
(1..5)) OF AC-BarringConfigSet-r11
}

AC-BarringExtConfigSet-r11 ::=      CHOICE {
    nonBarred-r11                   NULL,
    barred-r11                      SEQUENCE {
        ac-BarringExt-r11               BIT STRING (SIZE(10))
        ac-BarringExtCat-r11            ENUMERATED {all,
roaming, nonPreferred},
        ac-ApplicationCatogery                 Streaming
        ac-PriorityClass                       Low,
        ac-Application tag                     xxx

}
}
-- ASN1STOP
```

GRANULAR NETWORK ACCESS CONTROL AND METHODS THEREOF

TECHNICAL FIELD

The present invention relates to wireless networks particularly 3GPP network and more specifically relates to independent application granular network access control in the 3GPP network. The present application is based on, and claims priority from, an Indian Application Number, 1039/CHE/2012 filed on 21 Mar. 2012, the disclosure of which is hereby incorporated by reference herein.

BACKGROUND ART

With rapid development in User Equipments (UEs), the UEs are capable of operating in multi-access priority mode, with a wide variety of applications or services such as internet service, networked gaming, voice call service along with Machine Type Communication (MTC) applications each having different levels of priority and resource requirements. For example, some applications on these UEs such as voice call have normal priority, while applications such as MTC may have low priority for network access. Rise in demand for communication of large amounts of data to and from the UE are bound to overload the network and cause congestion in the communication network.

To address network overload and congestion issues that lead to excessive access attempts to a network, 3GPP specifies various mechanisms at various network levels such as rejecting connection requests based on UE priority, implementing Access Class barring (ACB) mechanism, Extended Access Barring (EAB) mechanism and so on. The Radio Resource Control (RRC) and Non Access stratum (NAS) connection request rejection mechanism provides a rejection message along with the rejection cause and a back-off time to the UE. Then the UE tries to re-attempt only after the back-off timer initiated by the UE expires. The EAB mechanism provides congestion control by barring the EAB configured UE's from accessing the network during network overloads and allowing re-attempts at a later instant of time when the EAB is alleviated by the network similar to ACB.

However, in accordance with current 3GPP standards, access barring mechanism or the RRC connection rejection mechanism specified applies to the UE as whole. Existing methods specified in 3GPP specification fail to apply congestion control individually to every application or specific application on the UE. Today the UE behavior is at a device level, i.e. when the network specifies a barring, it typically applies to all applications on that UE. Ideally for a UE supporting multiple applications each application should have a different priority level for accessing the network. For example, if the network applies EAB for low priority access, then existing methods bar the UE to access the network even for other normal priority applications on the UE that request service. Further the UE is "always on" in the packet switched network (LTE) and make these access controls (ACB/EAB) inefficient, as these access control mechanisms are only applicable to the UE in the Idle state. These requirements are intended to mitigate overload of the access network and/or core network under situation defined by operators, e.g. in heavy congestion or disaster case. There exists no mechanism for UEs that are in connected mode.

In the existing mechanisms, the ACB/EAB mechanism does not apply for UEs that are in the connected mode DRX (Discontinuous Reception mode) and there exists no mechanism to apply any barring mechanism to UEs that are already in connected mode. The UE could still continue Random Access Channel (RACH) message or Buffer Status Report (BSR) message and Scheduling Request (SR) messages to a network and get service, there is no way to stop a UE from sending service request once it is in a connected mode. It has to be noted that today almost all UEs continue to stay in connected mode for extended periods of time and as such there will be no mechanism left with a network to bar users when the network is congested.

In the light of above discussion, a method and system that defines a mechanism to have independent application granular network access control for the UE in the connected state and also in idle state is required.

DISCLOSURE OF INVENTION

Technical Problem

The principal object of the embodiments herein is to provide a method and system to have independent application granular network access control when the User Equipment (UE) is in connected state or idle state, where the granular barring is imposed by the network.

Another object of the invention is to provide a method that defines the UE behavior and the network behavior for controlling independent application granular network access on the UE, based on: granular category of the applications, granular category of the services and priority levels of the applications.

Another object of the invention is to provide a method for Access Stratum (AS) and Non Access Stratum (NAS) layer to handle back-off timer, reject cause values and Access Point Name (APN) configuration to support multi-application categories.

Solution to Problem

Accordingly the invention provides a method for defining User Equipment (UE) behavior when an independent granular network access control is indicated by a network, wherein the method comprises receiving at least one granular category in an indication from the network after a requesting application initiates a service request to access the network. Further the method comprises checking whether the requesting application belongs to at least one granular category independent of the barred category by the UE. Further the method comprises confirming whether the granular category of the requesting application belongs to the barred category. And the method further comprises holding the service request till an access barring is alleviated for the granular category, if the granular category of the requesting application belongs to the barred category.

Accordingly the invention provides a system for defining User Equipment (UE) behavior when an independent granular network access control is indicated by a network, wherein the system is configured to receive at least one granular category in an indication from the network after a requesting application initiates a service request to access the network. Further the system is configured to check whether the requesting application belongs to the at least one granular category independent of the barred category by the UE. Then the system is configured to confirm whether the granular category of the requesting application belongs to the barred category. And the system is further configured to hold the service request till an access barring is alleviated for the granular category, if the granular category of the requesting application belongs to the barred category.

Accordingly the invention provides a network for defining User Equipment (UE) behavior when an independent granular network access control is indicated by the network, wherein the network is configured to send at least one granular category in an indication after network experiences congestion in the network.

Accordingly the invention provides a User Equipment (UE) for access baring mechanism when an independent application level granular network access control is indicated by an access network, wherein the UE comprises an integrated circuit. Further the integrated circuit comprises at least one processor, at least one memory. The memory comprises a computer program code within the circuit. At least one memory and the computer program code with the at least one processor cause the UE to receive at least one granular category in an indication from the network after a requesting application initiates a service request to access the network. Further the UE is configured to check whether the requesting application belongs to the at least one granular category independent of the barred category. Then the UE is configured to confirm whether the granular category of the requesting application belongs to the barred category. And the UE is further configured to hold the service request till an access barring is alleviated for the granular category, if the granular category of the requesting application belongs to the barred category.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

Advantageous Effects of Invention

The embodiments herein achieve a method and system to handle User equipment (UE) behavior and network behavior for independent application granular network access control. The method disclosed herein provides a mechanism that defines behavior of the UE and the network which supports multiple application with different granular categories such as traffic category, quality of service (QoS), network assigned priority level, logical channel group, bearer type. The method individually denies (bars) or allows a requesting application on the UE to access network, based on granular category of the requesting application and/or priority levels of the requesting application within the granular category. The granular category is decided by the network and configured in the UE. The requesting application is the application on the UE that initiates service requests for network service access, when the UE is in either idle mode or in connected mode.

BRIEF DESCRIPTION OF DRAWINGS

This invention is illustrated in the accompanying drawings, throughout which like reference letters indicate corresponding parts in the various figures. The embodiments herein will be better understood from the following description with reference to the drawings, in which:

FIG. 5 illustrates an exemplary SIB type1x EAB information element that provides granular category and priority level of a requesting application to be considered for EAB, according to embodiments as disclosed herein.

MODE FOR THE INVENTION

Figure 1:
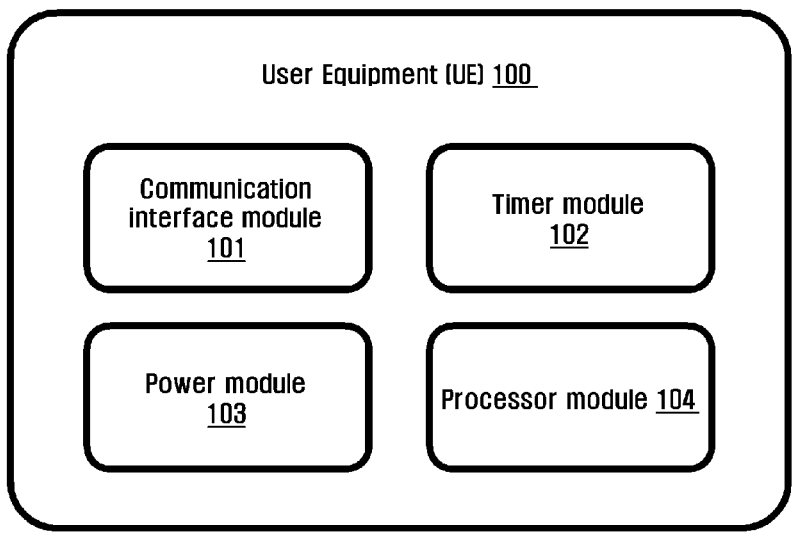
FIG. 1 illustrates various modules of a User Equipment (UE), according to embodiments as disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein can be practiced and to further enable those of skill in the art to practice the embodiments herein. Accordingly, the examples should not be construed as limiting the scope of the embodiments herein.

The embodiments herein achieve a method and system to handle User equipment (UE) behavior and network behavior for independent application granular network access control. The method disclosed herein provides a mechanism that defines behavior of the UE and the network which supports multiple application with different granular categories such as traffic category, quality of service (QoS), network assigned priority level, logical channel group, bearer type. The method individually denies (bars) or allows a requesting application on the UE to access network, based on granular category of the requesting application and/or priority levels of the requesting application within the granular category. The granular category is decided by the network and configured in the UE. The requesting application is the application on the UE that initiates service requests for network service access, when the UE is in either idle mode or in connected mode.

For example, the application category can be applications related to voice calls with voice call as application category, high priority level and Guaranteed Bit Rate (GBR) QoS category; while network/social gaming applications belongs to game application category with normal priority level and non-GBR QoS category. Also background data (e.g. keep alive messages) from any application is classified under 'infrequent' traffic category has low priority level, and non-GBR QoS category. Further, video call from any application is classified under 'streaming' traffic category, has medium priority level, and non-GBR QoS category.

Thus, the method enables the network to categorize the supported applications in to different granular categories and impose the independent application granular network access control to reduce the network resources in critical situations during network overload condition or when network experiences congestion and supports only critical applications. For example, the network impose barring of "Game Application" category, likewise, the network impose barring of "non-GBR" category, also the network impose barring of "streaming" traffic category.

In an embodiment, the network imposes barring for multiple granular categories at the same time. For example, the network imposes barring of "Game Application" application category and also "streaming" traffic category.

In an embodiment, the network can categorize each application that the UE supports as belonging to different granular category. For example, ChatOn application can be a granular category in itself as "ChatOn" category and can be assigned a code or a tag for access barring purposes.

In an embodiment, the granular category and possible barring information is indicated through Media Access Control (MAC) Control Element (CE) in a MAC message.

In an embodiment, the identification of the individual applications in to application category, priority level and QoS can be performed statically or dynamically by the network.

In an embodiment, the network defines tags or identifiers as defined by an operator for applications and indicates the application classification in a broadcast or a dedicated message to the UE for independent application granular network access control.

In an embodiment, the network operator defines the application tags and indicates the application tags to the UE in the Subscriber Identification Module (SIM) card, at subscription time.

In an embodiment, the network operator decides the application tags and notifies the UE over a suitable over the air (OTA) mechanism for subsequent use. For example, the OTA mechanism can be accessed through the Access network discovery and selection (ANDSF) server.

In an embodiment, the application tags are used by the network to bar specific applications either through the Access Stratum (AS) layer based mechanism including possible Medium Access Control (MAC) messages and/or through the Non Access Stratum (NAS) layer based mechanisms.

In an embodiment, the application tags are simple alphanumeric associated to specific applications. For example, number tag for Facebook application can be 111. For example Skype application can have an alphanumeric tag such as S123.

In an embodiment, the applications are organized as a bitmap for barring purposes and the same is indicated to the UE by a network in any possible manner in accordance with possible interaction mechanisms allowed between the UE and the network.

In an embodiment, the operator identifies most of the applications through tags, messages or bitmaps and uses a reserved tag, message or bitmap for all other applications that cannot be identified a priory. This allows for possible dynamic identification of new applications by a network and the UE for barring.

The method disclosed also specifies handling of back-off timers; reject cause values and Access Point Name (APN) configuration by AS and NAS layer in the network and in the UE to support independent application granular network access control.

In an embodiment, the UE can be a smart phone, a tablet, a note pad, a Personal Digital Assistant (PDA), a laptop, a smart camera, a Machine Type Communication (MTC) device and so on.

The method provides the independent application granular network access control mechanism that bars individual requesting applications on the UE to access the network rather than barring the UE completely. This enables the UE and the network to provide service to some application category even though some other application category on the UE is currently barred to receive service from the network.

Referring now to the drawings, and more particularly to FIGS. 1 through 5, where similar reference characters denote corresponding features consistently throughout the figures, there are shown preferred embodiments.

FIG. 1 illustrates various modules of User Equipment (UE), according to embodiments as disclosed herein. The figure depicts a UE 100 which comprises a communication interface module 101, a timer module 102, a power module 103 and a processor module 104. The communication interface module 101 enables the UE 100 to communicate with the network for servicing the request of the application on the UE 100. The timer module 102 comprises the back-off timers handled by the NAS when NAS level congestion control is active in the network.

In an embodiment, the NAS level congestion control is enabled using mobility management, session management or the like.

The power module 103 comprises a battery to power the UE 100. The processor module 104 processes various instructions for the UE 100 to perform plurality of operations such tracking the back-off timers, identifying granular category and/or priority level of the requesting application and so on.

Apart from the above mentioned modules, the UE 100 may also comprise of several other modules which fall within the scope of the invention known to a person with ordinary skill in the art.

Figure 2:
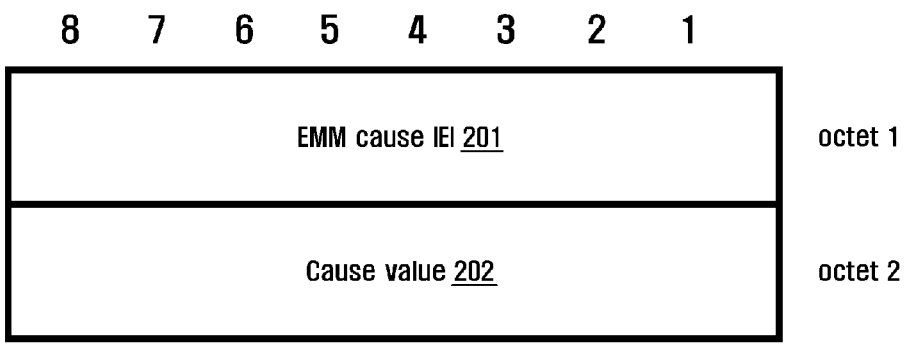
FIG. 2 illustrates a type 3 Evolved Packet System Mobility Management (EMM) cause information element with new reject cause values added in second octet, according to embodiments as disclosed herein.

FIG. 2 illustrates a type 3 EPS Mobility Management (EMM) cause information element with new reject cause values added in second octet, according to embodiments as disclosed herein. The figure depicts an EMM cause IEI 201 and cause value 202 in an EMM cause information element of EMM signaling, in accordance with 3GPP specification TS 24.301.

The network may detect EMM signaling congestion and perform NAS level mobility management congestion control. In accordance with the 3GPP standards, NAS level mobility management congestion control comprises general NAS level mobility management congestion control and subscribed APN based congestion control. In accordance with the 3GPP specification, EMM cause information element provides the reject cause during NAS level mobility management congestion control. The EMM cause information element comprises two octets (16 bits), wherein the octets include EMM cause IEI 201 (octet 1) and cause value 202 (octet 2).

For both congestion control mechanisms such as general NAS level mobility management congestion control and subscribed APN based congestion control, the method herein enables the network to indicate the defined granular category of the requesting application for which the congestion control is enabled. This enables the NAS level mobility management congestion control mechanism to apply congestion control individually to each requesting application on the UE 100 rather than to the UE 100 as whole.

In an example, the method provides new cause values comprising 'low priority access congestion' and 'back ground data congestion'. These new cause values enable the UE 100 to identify the type of granular category and/or priority level of the requesting application for which the congestion control is enabled and act accordingly.

Thus the method enables the UE 100 to attempt service request for other requesting applications that do not belong to the application category indicated in the cause value 202.

The EMM cause information element along with the new congestion cause values in the reject cause as 'low priority access congestion' and 'back ground data congestion' in octet 2 is given in the table below:

| Cause value (octet 2) | | |
|---|---|---|
| Bits | | |
| 8 7 6 5 4 3 2 1 | | |
| 0 0 0 0 0 0 1 0 | IMSI unknown in HSS | |
| 0 0 0 0 0 0 1 1 | Illegal UE | |
| 0 0 0 0 0 1 0 1 | IMEI not accepted | |
| 0 0 0 0 0 1 1 0 | Illegal ME | |
| 0 0 0 0 0 1 1 1 | EPS services not allowed | |
| 0 0 0 0 1 0 0 0 | EPS services and non-EPS services not allowed | |
| 0 0 0 0 1 0 0 1 | UE identity cannot be derived by the network | |
| 0 0 0 0 1 0 1 0 | Implicitly detached | |
| 0 0 0 0 1 0 1 1 | PLMN not allowed | |
| 0 0 0 0 1 1 0 0 | Tracking Area not allowed | |
| 0 0 0 0 1 1 0 1 | Roaming not allowed in this tracking area | |
| 0 0 0 0 1 1 1 0 | EPS services not allowed in this PLMN | |
| 0 0 0 0 1 1 1 1 | No Suitable Cells In tracking area | |
| 0 0 0 1 0 0 0 0 | MSC temporarily not reachable | |
| 0 0 0 1 0 0 0 1 | Network failure | |
| 0 0 0 1 0 0 1 0 | CS domain not available | |
| 0 0 0 1 0 0 1 1 | ESM failure | |
| 0 0 0 1 0 1 0 0 | MAC failure | |
| 0 0 0 1 0 1 0 1 | Synch failure | |
| 0 0 0 1 0 1 1 0 | Congestion | |
| 0 0 0 1 0 1 1 1 | UE security capabilities mismatch | |
| 0 0 0 1 1 0 0 0 | Security mode rejected, unspecified | |
| 0 0 0 1 1 0 0 1 | Not authorized for this CSG | |
| 0 0 0 1 1 0 1 0 | Non-EPS authentication unacceptable | |
| 0 1 0 0 0 0 1 1 | Requested service option not authorized in this PLMN | |
| 0 1 0 0 1 1 1 1 | CS service temporarily not available | |
| 0 1 0 1 0 0 0 0 | No EPS bearer context activated | |
| 1 0 1 1 1 1 1 1 | Semantically incorrect message | |
| 1 1 0 0 0 0 0 0 | Invalid mandatory information | |
| 1 1 0 0 0 0 0 1 | Message type non-existent or not implemented | |
| 1 1 0 0 0 0 1 0 | Message type not compatible with the protocol state | |
| 1 1 0 0 0 0 1 1 | Information element non-existent or not implemented | |
| 1 1 0 0 1 0 0 | Conditional IE error | |
| 1 1 0 0 1 0 1 | Message not compatible with the protocol state | |
| 1 1 0 1 1 1 1 | Protocol error, unspecified | |
| 1 1 1 0 0 0 0 0 0 | Low Priority Access Congestion | |
| 1 1 1 0 0 0 0 0 1 | Background Data Congestion | |

Any other value received by the mobile station shall be treated as 0110 1111, "protocol error, unspecified".
Any other value received by the network shall be treated as 0110 1111, "protocol error, unspecified".

In an embodiment, the method provides application category indication of respective applications in the APN configuration in the UE 100 and in the Home Subscriber Server (HSS), enhanced NodeB (eNB), Mobility Management Entity (MME), Policy Charging and Rule Function (PCRF) entity.

Priority level for the applications includes but is not limited to normal priority, medium priority and low priority.

In an embodiment, the application category and/or priority level of the APN of individual applications is operator specific and is mapped by the operator in user subscription (in the UE 100 and in the HSS).

In an embodiment, the operator maps the APN in Universal Subscriber Identity Module (USIM), APN configuration file, or new file of the UE 100. New file represents any file that can store the mapping between the individual applications and the barring category in the UE 100.

If the UE 100 is in roaming, then the configured application category information in the APN may not be valid.

In an embodiment, the priority level indication, application category and traffic category can be standardized.

In an embodiment, APN specific configuration can be informed by the network during attach procedure for the particular APN.

The example for the APN configuration is given below:
www (Full Internet)
Name=www
APN=www
MCC=404
MNC=20
APN Type=default
Application Category=Internet
Priority Level=normal In the above example, the method provides Application Category as Internet and priority Level as normal for internet browsing application in addition to the other existing configuration elements in the APN configuration.

In another example, the APN configuration elements with application category and priority level configured for the UE's MTC application is given below:
MTC
Name=MTC
APN=mtc
SCS=http://1.world.com/mtc/
SCS Proxy=10.10.1.100
SCS Port=9401
MCC=404
MNC=20
APN Type=MTC
Application Category=Time Controlled
Priority Level=Low In an embodiment, when the NAS level mobility management congestion control is active, the network provides a value for mobility management back-off timer in the RRC reject message for those requesting applications for which congestion control is enabled and configured in the APN. The UE 100 starts the back-off timer for the requesting application (for which the congestion control is enabled) as soon as it receives back-off timer value in the reject message for the particular application category and/or priority level of application for which the congestion control is enabled. The UE 100 starts the back-off timer with the value and stores the information on application category and/or access priority of the requesting application, so that the UE 100 determines whether for a new service request, running back-off timer is applicable or not.

In an embodiment, the UE 100 stores an indication that identifies if the back-off timer was started because the UE 100 accessed the network with a particular application or application category and/or priority. The UE 100 uses this indication to determine whether it is able to access the network when the back-off timer is running.

In an embodiment, the back-off timer can be a mobility management back-off timer, a session management back-off timer or the like.

In an embodiment, the service request procedure can be explicit service request message, packet data network (PDN) connectivity request, bearer resource modification request, and bearer resource allocation request and so on.

In an embodiment, the UE 100 is configured to use different back-off timers for different operator defined application and/or application category and/or application priority. Thus, the UE 100 determines whether it is able to access the network when the back-off timer is running to identify for which application and/or application category and/or application priority the timer applies.

Whenever a new service request is initiated by new application other than requesting application on the UE 100, it processes the new service request if the running back-off timer does not correspond to the new application. Thus, the method enables the UE 100 to process or block service request of the requesting application based on the application's granular category and/or priority level stored along with the timer, independent of whether any other requesting applications are blocked from accessing the network.

For example, the back-off timer is T3346 as in the existing 3GPP specifications.

Figure 3:
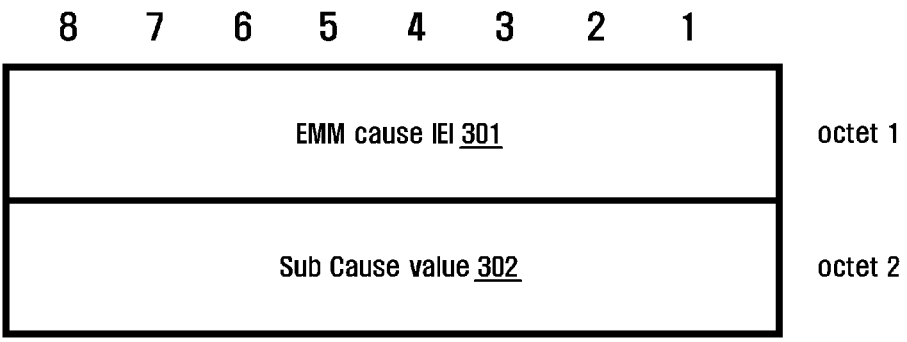
FIG. 3 illustrates a type 3 EMM cause information element with reject sub clause values added in the second octet, according to embodiments as disclosed herein.

FIG. 3 illustrates a type 3 EMM cause information element with reject sub clause values added in the second octet, according to embodiments as disclosed herein. The figure depicts an EMM cause IEI 301 in octet 1 and sub cause value 302 in octet 2 of the EMM cause information element of EMM signaling in accordance with 3GPP specification TS 24.301. The octet 1 with 8 Most Significant Bits (MSBs) is used for EMM cause value and the octet 2 with 8 Least Significant Bits (LSBs) is used for sub clause values provided by the disclosed method. The table below provides the octet 1 and octet 2 values with corresponding reject causes. The new sub clause 302 (octet 2) provides bit settings for 'low priority access congestion' and 'background data congestion'. The new sub clause values are provided in the EMM cause information element table below:

| Cause value (octet 1) | | | | | | | | |
|---|---|---|---|---|---|---|---|---|
| Bits | | | | | | | | |
| 8 | 7 | 6 | 5 | 4 | 3 | 2 | 1 | |
| 0 | 0 | 0 | 0 | 0 | 0 | 1 | 0 | IMSI unknown in HSS |
| 0 | 0 | 0 | 0 | 0 | 0 | 1 | 1 | Illegal UE |
| 0 | 0 | 0 | 0 | 0 | 1 | 0 | 1 | IMEI not accepted |
| 0 | 0 | 0 | 0 | 0 | 1 | 1 | 0 | Illegal ME |
| 0 | 0 | 0 | 0 | 0 | 1 | 1 | 1 | EPS services not allowed |
| 0 | 0 | 0 | 0 | 1 | 0 | 0 | 0 | EPS services and non-EPS services not allowed |
| 0 | 0 | 0 | 0 | 1 | 0 | 0 | 1 | UE identity cannot be derived by the network |
| 0 | 0 | 0 | 0 | 1 | 0 | 1 | 0 | Implicitly detached |
| 0 | 0 | 0 | 0 | 1 | 0 | 1 | 1 | PLMN not allowed |
| 0 | 0 | 0 | 0 | 1 | 1 | 0 | 0 | Tracking Area not allowed |
| 0 | 0 | 0 | 0 | 1 | 1 | 0 | 1 | Roaming not allowed in this tracking area |
| 0 | 0 | 0 | 0 | 1 | 1 | 1 | 0 | EPS services not allowed in this PLMN |
| 0 | 0 | 0 | 0 | 1 | 1 | 1 | 1 | No Suitable Cells In tracking area |
| 0 | 0 | 0 | 1 | 0 | 0 | 0 | 0 | MSC temporarily not reachable |
| 0 | 0 | 0 | 1 | 0 | 0 | 0 | 1 | Network failure |
| 0 | 0 | 0 | 1 | 0 | 0 | 1 | 0 | CS domain not available |
| 0 | 0 | 0 | 1 | 0 | 0 | 1 | 1 | ESM Failure |
| 0 | 0 | 0 | 1 | 0 | 1 | 0 | 0 | MAC failure |
| 0 | 0 | 0 | 1 | 0 | 1 | 0 | 1 | Synch failure |
| 0 | 0 | 0 | 1 | 0 | 1 | 1 | 0 | Congestion |
| 0 | 0 | 0 | 1 | 0 | 1 | 1 | 1 | UE security capabilities mismatch |
| 0 | 0 | 0 | 1 | 1 | 0 | 0 | 0 | Security mode rejected, unspecified |
| 0 | 0 | 0 | 1 | 1 | 0 | 0 | 1 | Not authorized for this CSG |
| 0 | 0 | 0 | 1 | 1 | 0 | 1 | 0 | Non-EPS authentication unacceptable |
| 0 | 0 | 1 | 0 | 0 | 0 | 1 | 1 | Requested service option not authorized in this PLMN |
| 0 | 0 | 1 | 0 | 0 | 1 | 1 | 1 | CS service temporarily not available |
| 0 | 0 | 1 | 0 | 1 | 0 | 0 | 0 | No EPS bearer context activated |
| 0 | 1 | 0 | 1 | 1 | 1 | 1 | 1 | Semantically incorrect message |
| 0 | 1 | 1 | 0 | 0 | 0 | 0 | 0 | Invalid mandatory information |
| 0 | 1 | 1 | 0 | 0 | 0 | 0 | 1 | Message type non-existent or not implemented |
| 0 | 1 | 1 | 0 | 0 | 0 | 1 | 0 | Message type not compatible with the protocol state |
| 0 | 1 | 1 | 0 | 0 | 0 | 1 | 1 | Information element non-existent or not implemented |
| 0 | 1 | 1 | 0 | 0 | 1 | 0 | 0 | Conditional IE error |
| 0 | 1 | 1 | 0 | 0 | 1 | 0 | 1 | Message not compatible with the protocol state |
| 0 | 1 | 1 | 0 | 1 | 1 | 1 | 1 | Protocol error, unspecified |

Any other value received by the mobile station shall be treated as 0110 1111, "protocol error, unspecified".
Any other value received by the network shall be treated as 0110 1111, "protocol error, unspecified".

| Sub Cause value (octet 2) | | | | | | | | |
|---|---|---|---|---|---|---|---|---|
| Bits | | | | | | | | |
| 8 | 7 | 6 | 5 | 4 | 3 | 2 | 1 | |
| 0 | 0 | 0 | 0 | 0 | 0 | 1 | 0 | Low Priority Access Congestion |
| 0 | 0 | 0 | 0 | 0 | 0 | 1 | 1 | Background Data Congestion |

Figure 4:
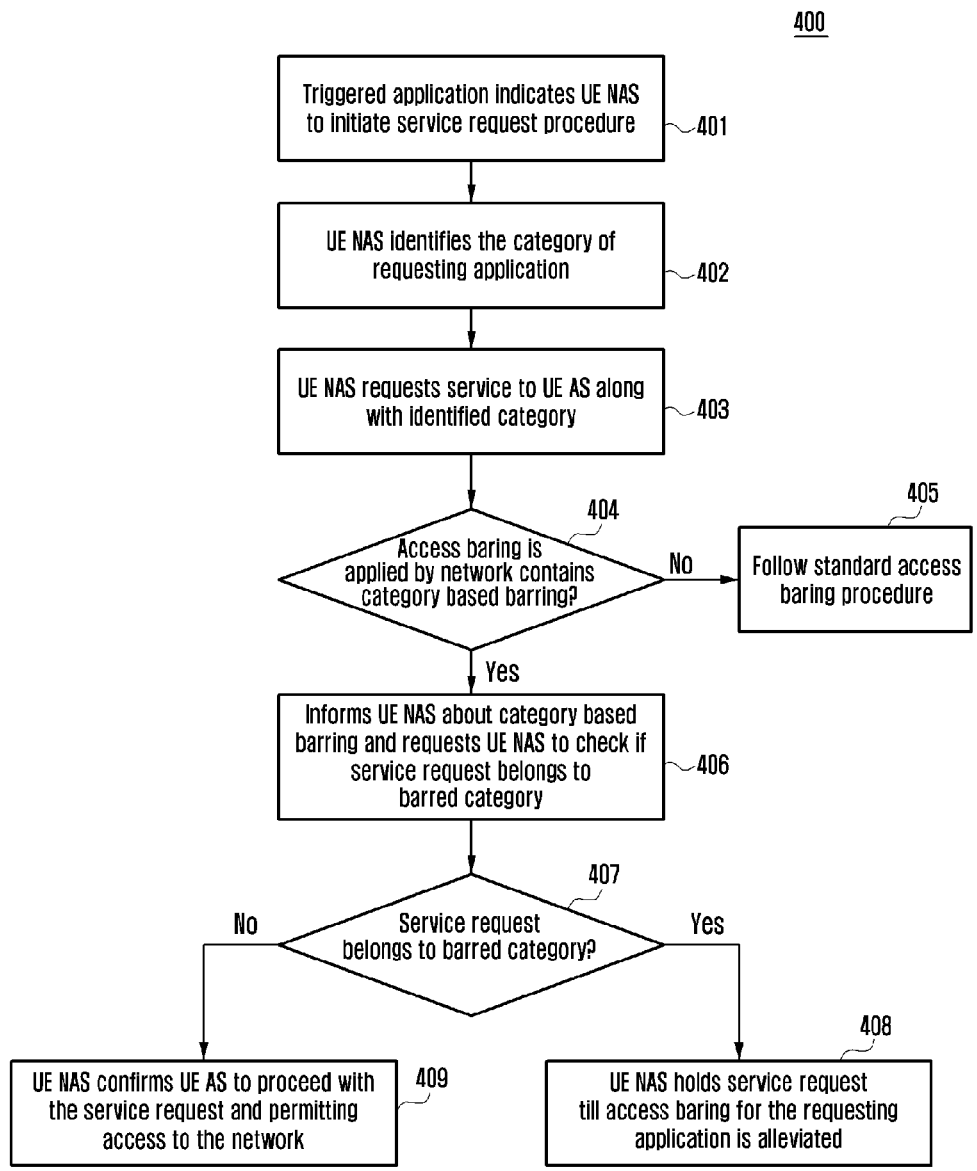
FIG. 4 illustrates a flow diagram explaining signaling process between NAS and AS for enhanced Access Class Barring (ACB) or Extended Access Barring (EAB) mechanism of the UE, according to embodiments as disclosed herein.

FIG. 4 illustrates a flow diagram explaining signaling process between NAS and AS for the enhanced Access Class Barring (ACB) or Extended Access Barring (EAB) mechanism of the UE, according to embodiments as disclosed herein. This method can be applied any possible new barring mechanism. As depicted in the flow diagram 400, at step 401, a triggered application on the UE 100 indicates a UE NAS to initiate service request procedure. Upon receiving the service request, at step 402, the UE NAS identifies the granular category of the requesting application.

In an embodiment, the APN configuration in the UE 100 enables the UE 100 to identify the granular category and/or priority level of the requesting application. In another embodiment, the configuration in the UE memory identifies the granular category and/or priority level of the requesting application.

At step 403, the UE NAS forwards the service request of requesting application to a UE AS. After receiving the request from the UE NAS, the UE AS holds the further processing of the service request until it receives the broadcasted enhanced ACB and EAB by the network in a latest modified or new System Information Block (SIBx), even if the UE is in connected mode.

In an embodiment, the SIBx publishes the specific barred application and/or application category and/or the traffic category that is to be considered independent application granular network access control.

On receiving the SIB (ACB/EAB), at step 404, the UE AS checks if access barring applied by the network contains granular category based barring. If granular access barring applied by the network does not comprise granular category based barring, then, at step 405, the UE AS follows the standard access barring procedure. Alternatively, a UE can also store the modified or new SIB carrying the barring category information, timer values or the like. Further the UE checks the stored system information for barring applicability and use the information before sending an access request for the new application and/or application category. Any stored system information with granular barring information shall have time validity and the time validity can be indicated by the network to the UE in any possible mechanism such as AS message, NAS message, Physical layer message, pre-configuration in a UE and the like.

In an embodiment, a network operator can send granular category based barring indication in NAS message, AS message or any other possible messages like the MAC message to the UE.

In an embodiment, the AS message can be a system information message (SIB), a radio resource control (RRC), message with reject cause, a Random Access Channel (RACH) reject message, a MAC message and the NAS message can be a NAS reject message with error or reject cause.

If access barring applied by the network comprises granular category and/or priority based barring, then, at step 406, the UE AS informs the UE NAS about the particular application, granular category and/or priority for which access barring is applied.

Further, at step 407, the UE AS signals the UE NAS to check whether the service request of the requesting application belongs to barred category.

In an embodiment, the individual applications are mapped to barred category based on Access Point Name (APN), application category, quality of service (QoS) category, logical channel group category, bearer type category, traffic category, which are defined by the operator.

If the service request belongs to barred category, then at 408, the UE NAS holds service request till access barring for the requesting application is alleviated. If the service request belongs to non-barred category, then at 409, the UE NAS confirms the UE AS to proceed with the service request and permit access to the network.

If a new application belonging to another priority level initiates a service request, then the method enables the UE NAS and the UE AS to process the new service request independently even though previous requesting application's service request is on hold.

In an embodiment, the network operator apply the barring indication based on a congestion and indicate the application or application category or a bearer or a logical channel group category in the reject cause, based on the map between the individual applications and the barred category.

In an embodiment, barring indication provides application category, value of back-off timer, reject cause.

In an embodiment, the NAS level barring indication can be maintained by the NAS level in the UE and the network and an AS level barring information can be maintained by the AS on the UE and the network.

Any new application that might get introduced after the deployment of the barring category can be dynamically categorized and indicated to the UE by any possible mechanism such as AS signaling, NAS signaling, Physical layer signaling or the like.

In another embodiment, any revocation of an application from a category can also be indicated dynamically to the UE by any possible mechanism such as AS signaling, NAS signaling, Physical layer signaling or the like.

In an embodiment, all applications that have not been categorized into any category by the network can be treated as a default category and the priority predefined for such default category applies for such applications.

The various actions in flow diagram 400 may be performed in the order presented, in a different order or simultaneously. Further, in some embodiments, some actions listed in FIG. 4 may be omitted.

FIG. 5 illustrates an exemplary SIB type1x EAB information element that provides granular category and priority level of a requesting application to be considered for EAB, according to embodiments as disclosed herein. The figure depicts the application category, application priority level (class) and application tag added to existing SIB 1x EAB information element. The figure shows the ac-application category as streaming which comprises ac-priority class as low with application tag as xxx.

In an embodiment, the system information message has a place holder for the application tag or the application or the application category that has been barred. The application to the tag value mapping is indicated through another or the same system information message. The application to the tag values can be pre-loaded in the UE 100 or sent in any existing or new dedicated message.

In an embodiment, the independent application granular network access control applies for UEs that are in either the idle or the connected mode.

When the UEs are in connected mode, the running application (s) is/are referred as ongoing application (s).

In an embodiment, the independent application granular network access control applies for UEs that are in connected mode and checks the status before initiating service request for the particular application.

In an embodiment, to ensure that the applications can be barred from the network when the network is congested, the UEs read the access barring report from the system information before sending the RACH message or the BSR message or the SR message for the barred category when in connected mode.

In an embodiment, the network (eNB) can bar the UE which is in connected mode from sending the BSR message for a Logical Channel Group (LCG) category thereby barring the applications associated with that LCG.

In an embodiment, the network can bar the UE which is in connected mode from sending a Schedule Request message for specified application categories. New scheduling request messages can be defined for each application category there by indicating the application category for which the access is being requested by a UE or the existing scheduling request message can be enhanced to indicate the application category for which the UE is requesting for uplink resources.

In an embodiment, the operator can define new LCGs per application or application category identified for barring purposes.

In an embodiment, the network indicates the list of applications categories or traffic categories or the UE class that are barred from sending the RACH or BSR message or SR message when in connected mode through a dedicated AS message. For example, the message can be RRC reconfiguration message.

In an embodiment, a new AS message can be defined to indicate the barring information for UEs in connected mode. UEs before sending the RACH or BSR message or SR message can consider the barring indication as indicated in the last received dedicated message. There can be a timer associated with the applicability of such barring indication. If the timer has expired, the UE ignores any barring indication, else the UE applies the barring indication that was last received by the dedicated message. In an example the timer could be associated with barring an LCG.

In an embodiment, the UE behavior is defined such that any connected mode UE will scan and read the system information for the access barring information and apply the barring to particular operator defined application category as indicated by the network before sending a RACH, BSR message, SR message or a service request messages. The procedures applicable for UEs when they are in idle mode also apply when UEs are in connected mode and when they want to initiate RACH procedure. In this RACH procedure the UE checks the application tag for barring information before initiating the RACH procedure. The network can indicate one or more tags in the barring information place holder in the system information message.

In an embodiment, if the NAS layer in the UE has the access barring information from a previous reading of the system information, then the NAS layer in the UE applies the barring information provided that the timer value is valid. The NAS layer in the UE can also request the AS layer in the UE for the latest access barring information before processing any service request.

The embodiments disclosed herein can be implemented through at least one software program running on at least one hardware device and performing network management functions to control the elements. The elements shown in FIG. 1 include blocks which can be at least one of a hardware device, or a combination of hardware device and software module.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The invention claimed is:

1. A method by a terminal, the method comprising:
receiving access information including a barring indication and a value of a timer from a network;
identifying, if a service request for an application is triggered, a category of the application;
identifying whether the category of the requested application belongs to a barred category included in the access information;
stopping, if the category of the application belongs to the barred category, the service request for the application until the timer is expired; and
proceeding, if the category of the application does not belong to the barred category, the service request for the application.

2. The method of claim 1, further comprising:
deactivating the application until the timer is expired, if the category of the application belongs to the barred category and the application is running.

3. The method of claim 1, wherein the category includes at least one of an application category, a traffic category, a quality of service (QoS) category, a logical channel group category, a bearer type category, or a priority level category.

4. The method of claim 1, wherein the value of the timer is determined based on a priority level of the category of the application.

5. The method of claim 1, further comprising:
mapping each application in the terminal to the barred category; and
processing the service request for the application if the category of the application is not included in the barred category.

6. The method of claim 1, wherein the access information is included in at least one of a system information message (SIB), a radio resource control (RRC) message, or a random access channel (RACH) reject message.

7. The method of claim 1, wherein the service request is transmitted via at least one of an explicit service request message, a packet data network (PDN) connectivity request, a bearer resource modification request, a scheduling request (SR), a buffer status report (BSR) message or a bearer resource allocation request.

8. A terminal comprising:
a transceiver configured to receive and transmit a signal; and
at least one processor configured to:
receive access information including a barring indication and a value of a timer from a network,
identify, if a service request for an application is triggered, a category of the application,
identify whether the category of the application belongs to a barred category included in the access information,
stop, if the category of the application belongs to the barred category, the service request for the application until the timer is expired, and
proceed, if the category of the application does not belong to the barred category, the service request for the application.

9. The terminal of claim 8, wherein the at least one processor is further configured to deactivate the application until the timer is expired if the category of the application belongs to the barred category and the application is running.

10. The terminal of claim 8, wherein the category includes at least one of an application category, a traffic category, a quality of service (QoS) category, a logical channel group category, a bearer type category, or a priority level category.

11. The terminal claim 8, wherein the value of the timer is determined based on a priority level of the category of the application.

12. The terminal of claim 8, wherein the at least one processor is further configured to:
map each application in the terminal to the barred category, and
process the service request for the application if the category of the application is not included in the barred category.

13. The terminal of claim 8, wherein the access information is included in at least one of a system information message (SIB), a radio resource control (RRC) message, a random access channel (RACH) reject message, a buffer status report (BSR) message, or a scheduling request (SR) message.

14. The terminal of claim 8, wherein the service request is transmitted via at least one of an explicit service request message, a packet data network (PDN) connectivity request, a bearer resource modification request, a scheduling request (SR), a buffer status report (BSR) message, or a bearer resource allocation request.

* * * * *